(12) United States Patent
Pagan et al.

(10) Patent No.: US 8,868,738 B2
(45) Date of Patent: Oct. 21, 2014

(54) AUTOMATIC SERVER POSITION DETERMINATION

(75) Inventors: William G. Pagan, Durham, NC (US); Devon D. Snyder, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/541,454

(22) Filed: Jul. 3, 2012

(65) Prior Publication Data

US 2012/0278483 A1 Nov. 1, 2012

Related U.S. Application Data

(63) Continuation of application No. 13/028,318, filed on Feb. 16, 2011.

(51) Int. Cl.
*H04L 12/24* (2006.01)
*H04L 29/08* (2006.01)

(52) U.S. Cl.
CPC ............... *H04L 41/12* (2013.01); *H04L 67/18* (2013.01)
USPC .......................................... 709/224; 370/254

(58) Field of Classification Search
CPC ........................................................ H04Q 1/16
See application file for complete search history.

(56) References Cited

U.S. PATENT DOCUMENTS

| | | | |
|---|---|---|---|
| 5,675,488 A | 10/1997 | McElhinney | |
| 7,092,943 B2 | 8/2006 | Roese et al. | |
| 7,295,556 B2 | 11/2007 | Roese et al. | |
| 7,606,938 B2 | 10/2009 | Roese et al. | |
| 7,706,369 B2 | 4/2010 | Roese et al. | |
| 7,739,402 B2 | 6/2010 | Roese et al. | |
| 7,792,943 B2 | 9/2010 | Chainer et al. | |
| 2005/0078009 A1* | 4/2005 | Shalts et al. | 340/635 |

(Continued)

FOREIGN PATENT DOCUMENTS

| | | |
|---|---|---|
| EP | 0087945 A1 | 1/2011 |
| WO | WO2011000209 A1 | 9/1983 |

OTHER PUBLICATIONS

DiBiase, David et. al. "Nature of Geographic Information", 2010 The Pennsylvania State University. http://natureofgeoinfo.org, 5 pages.
Kading, Joshua A., "USPTO Final Office Action" for U.S. Appl. No. 13/028,318, Mail date: Mar. 11, 2014, 11 pages.
Kading, Joshua A., "USPTO Office Action" for U.S. Appl. No. 13/028,318, Mail date: Nov. 20, 2013, 17 pages.
Reddy, Ajit K., "USPTO Final Office Action" for U.S. Appl. No. 13/028,318, Mail date: Apr. 11, 2013, 14 pages.

(Continued)

*Primary Examiner* — Hanh N Nguyen
*Assistant Examiner* — Joshua A Kading
(74) *Attorney, Agent, or Firm* — Katherine S. Brown; Jeffrey L. Streets

(57) ABSTRACT

A method is provided for determining the location of a target computer device, such as a server in an array of interconnected servers. In one embodiment, the method comprises selecting a first server defining a first point of an axis of a reference coordinate system and selecting a second server defining a second point of the axis. A first cable is connected from the target server to the first server and a second cable is connected from the target server to the second server. The location of the target server is determined according to the length of the first cable, the length of the second cable, and the locations of the first and second servers. The axis may be designated using an axis cable, by connecting a first end of the axis cable to the first server and connecting a second end of the axis cable to the second server.

12 Claims, 3 Drawing Sheets

(56) References Cited

U.S. PATENT DOCUMENTS

| | | |
|---|---|---|
| 2006/0071780 A1* | 4/2006 | McFarland ................ 340/539.2 |
| 2006/0171538 A1* | 8/2006 | Larson et al. ................ 380/270 |
| 2007/0050497 A1 | 3/2007 | Haley et al. |
| 2008/0155094 A1 | 6/2008 | Roese et al. |
| 2009/0102642 A1 | 4/2009 | Huseth et al. |
| 2010/0033339 A1* | 2/2010 | Gurley et al. ............. 340/686.1 |
| 2012/0124226 A1* | 5/2012 | Hu et al. ....................... 709/228 |
| 2012/0166598 A1* | 6/2012 | Yuan et al. ................... 709/220 |
| 2012/0209988 A1* | 8/2012 | Pagan et al. ................. 709/224 |
| 2012/0278483 A1 | 11/2012 | Pagan et al. |

OTHER PUBLICATIONS

Reddy, Ajit K., "USPTO Office Action" for U.S. Appl. No. 13/028,318, Mail date: Dec. 18, 2012, 16 pages.

Reddy, Ajit K., "USPTO Office Action" for U.S. Appl. No. 13/028,318, Mail date: Sep. 13, 2012, 16 pages.

Official Gazette Notice: Subject Matter Eligibility of computer Readable Media (Jan. 26, 2010), 1351 OG 212, Feb. 23, 2010, 1 page.

Merriam-Webser.com, "Tangible", n. d. Web. <http://www.merriam-webster.com/dictionary/tangible>, Nov. 4, 2013, 1 page.

\* cited by examiner

AUTOMATIC SERVER POSITION DETERMINATION

CROSS-REFERENCE TO RELATED APPLICATIONS

This application is a continuation of co-pending U.S. patent application Ser. No. 13/028,318, filed on Feb. 16, 2011.

BACKGROUND OF THE INVENTION

1. Field of the Invention

The present invention relates to management of a network of servers, and more particularly to tracking the location of servers within a datacenter.

2. Background of the Related Art

Large, sophisticated computer systems are often formed by interconnecting a plurality of smaller computer systems to combine the computing resources of the smaller computer systems. For example, a multi-blade server chassis may provide the combined computing resources of a plurality of blade servers in the server chassis. Multiple server chassis may be supported on racks to form even larger computer systems. A datacenter may include numerous equipment racks on which a large number of server chassis are supported. A large computer system comprised of multiple server chassis typically requires numerous, very specific cable connections to achieve the desired system configuration.

When deploying a large number of systems in a datacenter, it becomes challenging to track and determine the location of all the servers within the datacenter. Conventionally, when an issue arises with a server, a visual alert such as a bluelight identifier on a particular server may be activated to indicate which server has an issue. However, in a large data center, it is possible to have multiple alerts from different servers at a particular moment, making it difficult to determine which of the servers has a particular issue. Alternatively, alerts may be sent out over a local area network (LAN) containing the name of the server having a particular issue along with a description of the issue. However, the name of the server is not always helpful in locating where that particular server is located. Knowledge of the type of server having an issue can also be helpful, except that many servers of the same type may be present in the datacenter.

BRIEF SUMMARY OF THE INVENTION

One embodiment of the present invention provides a method. In an array of computer devices having a plurality of rows and columns, a first computer device is selected defining a first point of an axis of a reference coordinate system and a second computer device is selected defining a second point of the axis. The first and second computer devices are optionally selected using an axis cable by connecting a first end of the axis cable to the first computer device and connecting a second end of the axis cable to the second computer device. A first cable is connected from a target computer device whose location is to be determined to the first computer device. A second cable is connected from the target computer device to the second computer device. The length of each of the first and second cables is determined. The location of the target server within the reference coordinate system is determined according to the length of the first cable, the length of the second cable, and the locations of the first and second computer devices.

DETAILED DESCRIPTION OF THE INVENTION

Figure 1:
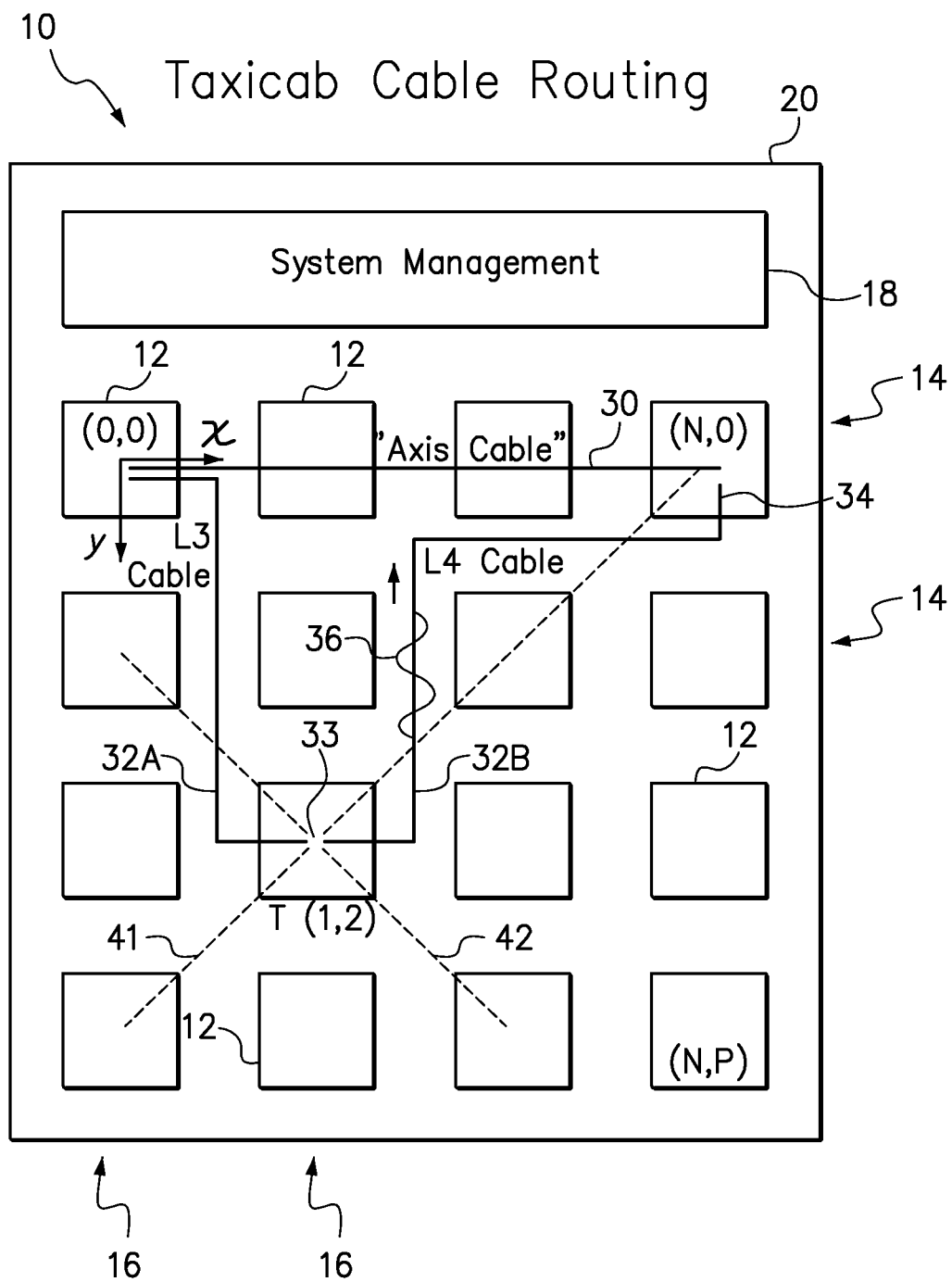
FIG. 1 is a schematic diagram of an array of servers to be interconnected using taxi-cab cable routing.

Embodiments of the present invention include a system and method for individually locating computer devices, such as servers or multi-server chassis, in a computer system comprising a plurality of interconnected computer devices. In one embodiment, an array of servers is interconnected using a plurality of data cables. In a fully-meshed configuration, for example, each server in the array is connected to each of the other servers in the array by a data cable. The array of servers may be the servers in a rack on which a plurality of multi-server chassis are supported, resulting in a plurality of rows and columns of servers. Two servers in the array are selected to define an axis of a reference coordinate system by connecting them together with an axis cable. The location of a target server may be determined using the length of a first cable connecting the target server to the first server, the length of a second cable connecting the target server to the second server, and the distance between the first server and the second server. In one embodiment, each of the servers in the array of servers are interconnected using taxi-cab cable routing. In another embodiment, each of the servers in the array of servers are interconnected using direct cable routing. The choice of taxi-cab cable routing or direct cable routing affects the analysis used by a systems management device to locate the servers within the array.

In the embodiments disclosed below, the two points defining the reference axis are optionally identified by the connection of an axis cable. The axis cable may be one of the cables used to interconnect the servers in a fully-meshed configuration, or a separate cable. The axis cable is connected at one end to the first server that is designated as the origin. The axis cable is connected at the other end to a second server, which it typically in the same row or column, designated as the origin. The axis cable is thereby aligned with the desired reference axis defined by point locations of the first and second servers. The connection of the axis cable to the first and second servers is detected by a systems management device, and thereby defines the axis of the reference coordinate system. One or both of the first and second servers can determine the length of the axis cable, as discussed in greater detail below. Thus, the locations of the first and second servers are known by virtue of being used to define the reference axis. By virtue of the fully-meshed configuration, each of the other servers in the array will be connected to the two servers defining the reference axis. The location of any other server in the array may therefore be located according to the length of a cable connecting that server to the first server (at the origin) and the length of another cable connecting that server to the second server (at the second point along the axis).

The embodiments disclosed below and illustrated in the figures are directed, by way of example, to individually locating servers in one or more racks. However, those skilled in the art will appreciate that the disclosed systems and methods may be used to locate computer devices of any type within an array of computer devices. As used herein, the term "computer device" is generally understood to include a device having at least one processor, which may be mounted on a motherboard, and one or more physical networking ports for cooperatively connecting with selected other computer devices using cables. Non-limiting examples of a computer device include a server, switch, router, module and chassis. A computer device may optionally be modular in the sense that it may be a self-contained unit that is physically separable from other devices or modules and may be removably positioned in one of a plurality of predefined locations provided in a structural framework. For example, in a blade server system, a rack provides a structural framework for a plurality of chassis, while each chassis provides a structural framework for one or more servers. Thus, on one level, each rack-mountable chassis in a multi-chassis system may be regarded as a computer device; and on another level, individual servers, workstation blades, and other chassis-mounted devices may also be regarded as computer devices.

FIG. 1 is a schematic diagram of a computer system 10 having an array of servers 12 to be interconnected using a "taxi-cab" cable routing. The array of individual servers 12 includes a plurality of "N" columns 14 (i.e., from left to right) and "P" rows 16 (i.e., from top to bottom), where N=4 and P=4 in this example. To simplify illustration of the inventive features, the servers 12 are schematically shown with a square shape and with uniformly spaced rows 14 and columns 16, wherein the row spacing equals the column spacing. However, recognizing that a server may have a rectangular or oblong frontal shape and that an arrangement of servers in a computer system may have a different number and spacing of rows and columns, the methods disclosed herein may be applied to any arrangement of servers having different combinations of server shape, number of rows and columns, and row and column spacing.

The array of servers 12 may represent the arrangement of servers 12 positioned in a rack, as generally outlined at 20. The servers 12 may be supported directly on the rack 20 or, more commonly, the servers 12 may be removably inserted into one or more rack-mounted chassis (omitted for clarity). The size of the array in this instance is determined by the number of servers 12 per rack 20 and the number of racks 20 in the system 10. Here, there is a single rack 20 supporting an array of sixteen servers, with four servers 12 per row 14 and four servers 12 per column 16. Each row 14 of four servers 12 may represent the servers of one 4U (four servers per unit) chassis, for example, with four vertically-arranged chassis being stacked or otherwise supported on the rack 20. Typically, the individual chassis will include individual chassis bays having a standard size and with a uniform spacing between server bays. Thus, four vertically spaced chassis having four servers 12 per chassis in the rack 20 may provide the four rows 14 and columns 16 of servers 12 in the array.

The servers 12 in the system 10 may be interconnected using electronic data cables 32. The cables 32 may be any of a variety of data or networking cables known in the art, and are used to provide data connections between servers 12. Only three cables are shown in FIG. 1 by way of example, including two data cables 32A, 32B and an axis cable 30. However, according to the method, as many data cables 32 of assorted lengths may be provided to allow an installer to interconnect the servers 12 in a fully-meshed configuration, in which each server 12 is connected by a separate data cable 32 to every other server 12 in the array. In the example array of sixteen servers 12, a fully meshed configuration will require any one server 12 to be connected to each of the other fifteen servers 12 in the array.

According to one embodiment, a method is provided wherein the location of any target server $T(x,y)$ may be determined with respect to a reference coordinate system $(x,y)$. By way of example, the target server in FIG. 1 is $T(1,2)$. According to the method, the reference coordinate system is automatically determined by the connection of a special axis cable 30. The axis cable 30 may be one of the data cables 32 used to provide the fully meshed configuration, or a separate cable, and need not by physically different from the other cables 32. The identity of the axis cable 30 is communicated to a systems management device 18 that stores the coordinates of the servers 12 that this particular cable is the axis cable 30. The identity of the axis cable 30 may be communicated, for example, using an IPMI (Intelligent Platform Management Interface) command, by a configuration utility, or by pressing a front panel button. In another embodiment, the points along the reference axis defined by the axis cable 30 may be manually input into the systems management device 18 via a systems management interface.

The systems management device 18 may include processors on individual servers 12, one or more chassis management module, or a combination thereof. In the present embodiment, wherein individual servers 12 are to be selectively located, the systems management device 18 may comprise a micro-controller configured with management firmware, such as a baseboard management controller residing on one or more server 12 in the array. The systems management device may alternatively include a dedicated multipurpose device running management firmware, such as a chassis management module for managing a plurality of the servers 12 within a particular chassis. The systems management device may also be configured as a server 12 running management software from within its operating system, which optionally reports to a chassis management module. In another embodiment wherein each of a plurality of different chassis are to be selectively located, the systems management device 18 may be a chassis management module residing on one of the chassis, wherein that chassis management module handles the interconnections for the plurality of chassis.

The installer (person) will preferably ensure that the axis cable 30 extends the full length or height of the array of servers being networked together. The x-axis of the reference coordinate system is then defined by locations of the two servers 12 that the installer chooses to connect using the axis cable 30. The axis cable 30 is routed directly between the first and second servers, and is therefore generally aligned with the x-axis it defines. When the axis cable 30 has been connected and the reference coordinate system identified, the location of each other server 12 in the array may be determined, as represented by coordinates of the reference coordinate system. Here, the axis cable 30 has been connected at one end to a first server, defining the origin (0,0), and then connected to a second server at (N,0). The length of the axis cable 30 determines the value of "N." Here, a unit spacing between servers 12 is equal to one unit, so the axis cable 30 is four unit longs, setting N=4.

The location of each server 12 may be represented by the coordinates of a selected point on the server. Here, for example, the point location of each server 12 is taken at the center of the server 12, as viewed from the front. The cables 30 and 32 are schematically shown as extending to the center of each server 12, although the actual physical location of the connectors may be anywhere on the server 12. A cable 32 may be connected to connectors having the same relative position on the two connected servers 12, so that the length of the cable is of a more predictable length based on the relative positioning of the two connected servers 12.

The cables 32 may be routed in a known manner to facilitate the mathematical determination of server location. In the configuration of FIG. 1, the cables 32 are routed in a "taxi-cab" configuration, comprising substantially only ninety-degree bends within the XY plane, where the y-axis is considered to be perpendicular to the x-axis defined by the axis cable and passes through the origin (0,0). Special hardware such as cable guides may be used to guide and secure the data cables 32 in the taxi-cab configuration. The cables 32 are provided in an assortment of different cable lengths, so that any two servers 12 may be connected using a data cable 32, following the taxi-cab routing without excess slack. The taxi-cab configuration allows the servers 12 to be interconnected by data cables 32 of different lengths that vary in size by multiples of a fixed unit. One "unit" in this example equals the spacing between any two servers 12. For example, an "L1" cable is one unit long, an "L2" cable is two units long, an "L3" cable is three units long, and so forth. Thus, an L1 cable may be used to connect adjacent servers 12, an L2 cable may be used to connect servers located two units apart, an L3 cable may be used to connect servers located three units apart, and so forth. Here, the distance between two servers means the distance along the path of the cable between those two servers, rather than the straight-line distance. By way of illustration, a first cable 32A, having a length L3, connects the target server T(1,2) with the first server at (0,0), and a second cable 32B, having a length L4, connects the target server T(1,2) with the second server at (4,0).

The length of each cable 30, 32A and 32B may be determined by the systems management device 18 in a variety of ways. In one implementation, the length of each cable may be stored in a machine-readable format on an electronically readable storage device of the cable 32. For example, the cable length may be stored on a chip with Vital Product Data (VPD) on each cable 32. VPD may be burned onto an EEPROM (Electrically Erasable Programmable Read-Only Memory) associated with a hardware component (in this case, on each data cable 32).

Alternatively, the length of each cable 30, 32A, 32B may be determined by transmitting a signal through the cable and measuring a length-dependent behavior of the signal. For example, the length of the second cable 32B may be determined by generating a signal 36, transmitting the signal from a first end 33 of the second cable 32B, and measuring the amount of time it takes to reach a second end 34 of the second cable 32B, or by measuring the amount of time it takes for the signal 36 to reflect off of the second end 34 and return to the first end 33 of the cable 32B. Then, a known signal propagation rate may be plugged in to a formula to determine the length of the cable 32.

The location of the server T(1,2) or any other server 12 in the array may then be determined with respect to the reference coordinate system (x,y). Specifically, the location of a target server may be mathematically determined from the length of the data cable 32 connecting the target server to the first server at (0,0) and the length of the data cable 32 used to connect the target server to the second server at (N,0). For example, the first cable 32A connecting the target server T(1,2) to the origin (0,0) is three units long, and the second cable 32B connecting the target server T(1,2) to the second server at (N,0) is four unit long. With the taxi-cab cable routing, a first subset of servers {(3,0), (2,1), (1,2), (0,3)} may be determined that are each three units away from (0,0), as identified by a first diagonal line 41 through the first subset of servers. Likewise, a second subset of servers {(0,1), (1,2), (2,3)} may be determined that are each four units away from the second server at (N,0), as identified by a second diagonal line 42 through the second subset of servers. The intersection of these two subsets {(3,0), (2,1), (1,2), (0,3)} and {(0,1), (1,2), (2,3)} is the pair of coordinates (1,2), which is the location of the target server T(1,2). Graphically, this is confirmed as being the intersection of the two diagonal lines 41, 42. Thus, the location of the target server T(1,2) can be determined based on the lengths of the cables 32A, 32B connecting the target server T(1,2) to the two servers connected by the axis cable 30. This method of determining the two subsets of servers and identifying their intersection may be accomplished in any of a variety of mathematical approaches which will be recognized by one skilled in the art having the benefit of this disclosure. For example, to implement this method, an assembly programmer may choose an algorithm that is chipset-optimized for fastest possible computation, or a software architect may choose an algorithm having the fewest total steps.

Figure 2:
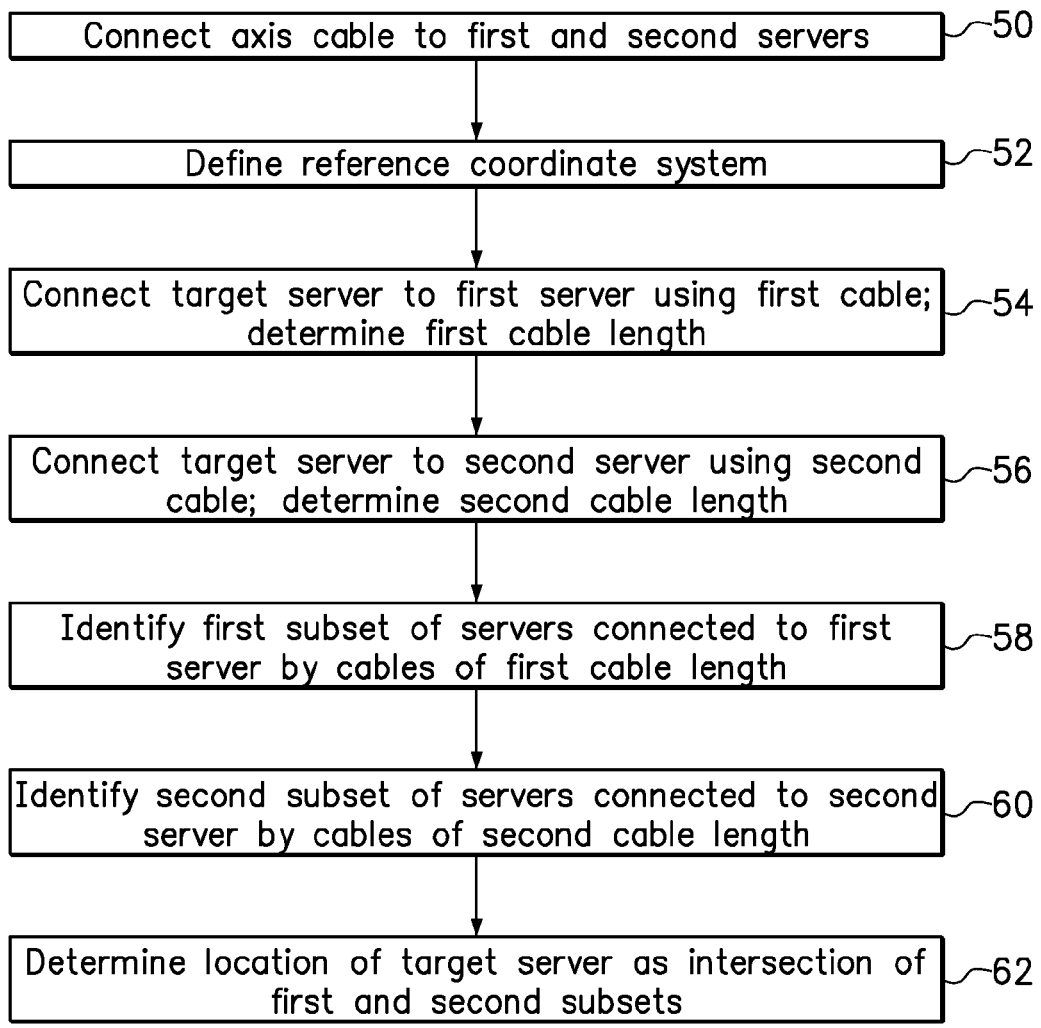
FIG. 2 is a flowchart generalizing the method of locating a target server within an array of servers interconnected using taxi-cab cable routing.

FIG. 2 is a flowchart generalizing the method of locating any particular server (i.e. a "target server") within an array of servers interconnected in a taxi-cab configuration. In step 50, an axis cable is connected to first and second servers. To connect the axis cable, a first end of the axis cable may be plugged in to a connector on the first server and a second end of the axis cable may be plugged in to a connector on the second server. In step 52, a reference coordinate system is defined by the connection of the axis cable to the first and second servers. The point locations of the first and second servers may define points along an axis of the reference coordinate system. A user may define which of the first and second servers is the origin of the reference coordinate system by which end of the cable the user plugs in first. For example, if the user plugs in the first end of the axis cable to the first server prior to plugging in the second end of the axis cable to the second server, the location of the first server may be automatically designated by a systems management device as the origin and the location of the second server, accordingly, defines a point along the axis. The length of the axis cable may determine the coordinate of the second server. For example, if the axis defined by the axis cable is treated as the "x" axis, and the cable has a length of N units, then the location of the second server is (0,N).

Steps 54-62 are used to determine the location of the target server with respect to the reference coordinate system defined by the axis cable. The target server may be any server in the array other than the first and second servers to which the axis cable is connected, whose locations are known by virtue of their connection to the axis cable. In step 54, the target server is connected to the first server using a first cable. The length of the first cable is determined, such as by electronically reading VPD included with the first cable or by generating a signal and measuring a length-dependent property of the signal. In step 56, the target server is connected to the second server using a second cable. The lengths of the first and second cables may be similarly determined. In step 58, a first subset of servers is determined that are connected to the first server by cables having the length of the first cable. In step 60, a second subset of servers is determined that are connected to the second server by cables having the length of the second cable. In step 62, the location of the target server is determined as the intersection of the first and second subsets of servers. The determination of the first subset of servers in step 58 is, essentially, a step of determining which servers in an array could be the first cable-length away from the origin. The determination of the second subset of servers in step 60 is, likewise, a step of determining which servers in the array could be the second cable-length away from the second server (e.g. N,0). The determination of the intersection of these two subsets of servers is essentially a step of determining which one server in the array can be both the first cable length away from the first server and the second cable length away from the second server. Such determinations may be performed mathematically using any of a variety of algorithms.

Figure 3:
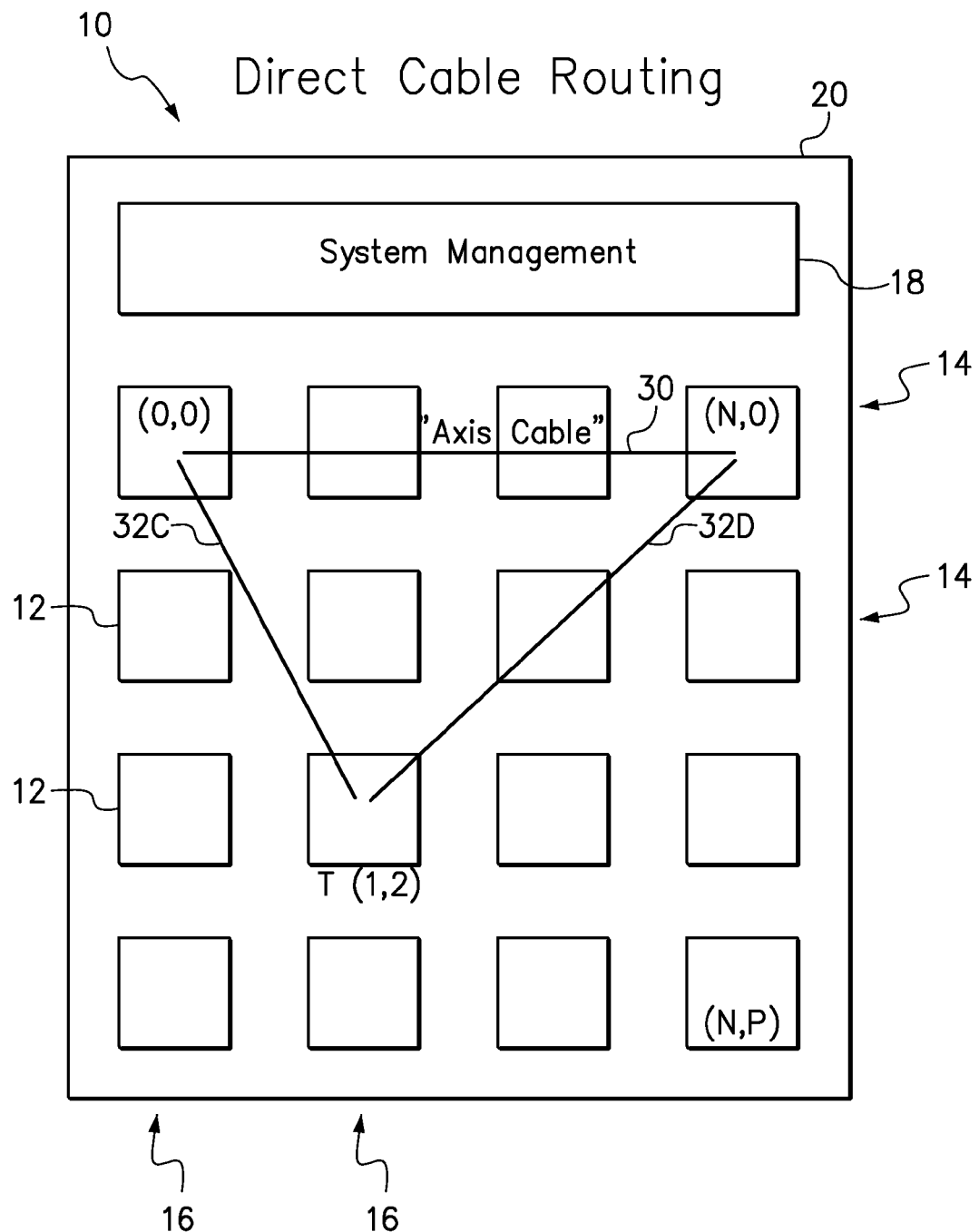
FIG. 3 is a schematic diagram of the array of servers interconnected using direct cable routing.

FIG. 3 is a schematic diagram of the computer system 10, wherein the same array of servers 12 of FIG. 1 are to be interconnected using a "direct" cable routing instead of the "taxi-cab" cable. A first cable 32C is routed in a straight-line path, directly from the target server T(1,2) to the server at (0,0). A second cable 32D is routed in a straight-line path, directly from the target server T(1,2) to the server at (N,0). The direct-routed first and second cables 32C, 32D are shorter than the taxi-cab routed first and second cables 32A, 32B of FIG. 1. Because of the direct routing, a set of cables having particular lengths are required to interconnect the servers 12 in a fully meshed configuration. As a result, the cable lengths will not vary in size by multiples of a fixed unit, as they did in the taxi-cab configuration. However, a fully meshed configuration may still be achieved with a finite number of different cable lengths. The direct routing also avoids some of the hardware required to guide and secure the cables in the taxi-cab configuration of FIG. 1.

As in the taxi-cab routed cabling configuration of FIG. 1, the location of the two servers 12 connected by the axis cable 30 are known because those two servers define points (0,0) and (N,0) along the reference axis. However, determining the location of a target server within the array may not require determining first and second subsets of servers that are first and second cable lengths away from the two servers (0,0) and (N,0). Due to the direct routing, it may turn out that for a given cable length, only one server in the array may be the given cable length away from (0,0) or (N,0). For example, assuming the cable lengths are determined with sufficient precision, only the target server T(1,2) is the length of the first cable 32C away from the origin (0,0), and only the target server T(1,2) is the length of the second cable 32D away from (N,0).

Rather, a mathematical formula may be applied to determine the location of a target server. For example, using trigonometry, the distance between two points (x1,y1) and (x2,y2) on a Euclidean plan may be determined by the known distance formula, $d=SQRT((\Delta x)^2+(\Delta y)^2))=SQRT((x2-x1)^2+(y2-y1)^2)$. Consequently, using cables of precisely-determined length, the precise location of the target server may be determined, rather than using the length units defined according to the server spacing in the taxi-cab routed configuration of FIG. 1.

Referring generally to both the taxi-cab routed cabling configuration of FIG. 1 and the direct-routed cabling configuration of FIG. 2, the order in which the data cables are connected may be considered in performing the method. In one embodiment, the first cable to be connected may be automatically deemed by a systems management device to be the axis cable. The first cable to be connected, deemed as the axis cable, is then used to define the coordinate system with respect to which all subsequently connected servers are located. This approach is particularly useful in an embodiment wherein the axis cable is one of the set of data cables used to interconnect the servers in the array. Connecting the axis cable first provides a way for a system installer to select which row or column of servers to be selected for the reference axis, and for the system to automatically infer which one of the many cables used in the system is to be regarded as the axis cable.

In another embodiment, the identity of the axis cable may be determined irrespective of the order in which the cables are connected. A system may be fully cabled, such as in a fully meshed configuration, before an axis cable is identified and a reference coordinate system is defined. For example, an installer may first fully cable the system in the desired configuration, while ensuring that at least one cable extends the full length or height of the array of servers being networked together. After visually verifying that the system is fully cabled, the installer may designate to the system which of the cables is the axis cable, or the system may determine on its own which of the cables is the axis cable, such as if one of the axis cables is identified by its VPD as being the axis cable. Anytime thereafter, the system may perform the steps of automatically determining the locations of the servers in the array.

The systems management device may wait until the system is fully cabled and then perform the process of automatically determining the locations of the servers within the array. The system may wait for instructions from the installer that the system has been fully cabled. Alternatively, the system may be prepared to determine the location of a particular server in the array as soon as that server has been connected to both the origin server (0,0) and the server at (N,0), even when the system is not yet fully cabled. If the systems management device is in communication with two servers that determine the axis, then the systems management device may be able to detect when a selected target server in the array has been cabled to those two servers. Thus, in many cases, the system need not be fully cabled for the locations of at least some of the servers to be determined.

Rather than determining the locations of all of the servers in the array, a systems management device may instead selectively determine the locations of servers, on an as-needed basis. For example, in the course of operating an array of servers, such as in a datacenter, it is natural for an occasional issue to arise, such as a detected error condition or maintenance requirement for a particular server. An alert may be generated in response to the detected issue. In a datacenter with hundreds or thousands of servers, the location of a server may be determined in response to such an alert, and the location of the server generating the alert may be identified to an administrator using the disclosed methods.

It should be understood that the methods of the present invention may be performed by the systems management device, the servers, or some combination of the systems management device and the servers. In particular, many of the foregoing discussions focused on the systems management device determining the location of a target server. In order for the systems management device to make this determination, it is necessary to know the cable lengths to the first and second servers. The systems management device may obtain these cable lengths from the target server, or from the first and second servers so long that the particular server can identify the relevant cable. However, it is equally possible for the target server to determine its own location, which allows the target server to provide its location to the system management device along with an alert. For example, the target server may determine the lengths of the first and second cables and receive data indicating the locations of the first and second servers, such that the target server can determine its location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

in an array of computer devices having a plurality of rows and columns, a system management device selecting a first computer device defining a first point of an axis of a reference coordinate system in direct response to connecting a first end of an axis cable to the first computer device and selecting a second computer device defining a second point of the axis in direct response to connecting a second end of the axis cable to the second computer device, wherein the axis cable extends the full length or height of the array of computer devices;

connecting a first cable from a target computer device whose location is to be determined to the first computer device and connecting a second cable from the target computer device to the second computer device;

determining the length of the first cable connected from the target computer device to the first computer device;

determining the length of the second cable from the target computer device to the second computer device; and the system management device determining the location of the target computer device within the reference coordinate system according to the length of the first cable, the length of the second cable, and the locations of the first and second computer devices.

2. The method of claim 1, further comprising:

the system management device automatically designating the first computer device as the origin in response to detecting the connection of the first end of the axis cable to the first computer device prior to detecting the connection of the second end of the axis cable to the second computer device.

3. The method of claim 2, further comprising:

automatically determining the length of the axis cable; and determining the location of the second computer device according to the length of the axis cable.

4. The method of claim 1, wherein determining the location the target computer device with respect to the reference coordinate system comprises:

identifying a first subset of computer devices in the array that are connected to the first computer device by a cable equal to the length of the first cable;

identifying a second subset of computer devices in the array that are connected to the second computer device by a cable equal to the length of the second cable; and determining the location of the target computer device as the intersection of the first and second subset of computer devices.

5. The method of claim 1, further comprising:

interconnecting the array of computer devices in a fully meshed configuration, such that each computer device in the array is connected by a cable to the first computer device and by a cable to the second computer device, and the target computer device may be any computer device in the array.

6. The method of claim 1, further comprising:

routing the cables in a taxi-cab configuration comprising substantially only ninety-degree cable bends along a pathway between computer devices; and interconnecting the computer devices using cables that differ in length by multiples of a fixed increment.

7. The method of claim 1, further comprising:

routing the cables in a straight line configuration comprising substantially no cable bends.

8. The method of claim 7, further comprising:

using triangulation to determine the location of the target computer device in the array of computer devices.

9. The method of claim 1, wherein the column and row spacing of the computer devices in the array are substantially equal.

10. The method of claim 1, further comprising:

determining a cable length of any of the cables by transmitting a signal through the respective cable and measuring a length-dependent behavior of the signal.

11. The method of claim 1, further comprising:

electronically storing a cable length of each cable on a storage device included on the respective cable; and automatically reading the cable length from the storage device in response to connecting one or both ends of the respective cable to one of the computer devices in the array.

12. The method of claim 1, wherein the target computer device to be located comprises one of a plurality of servers or one of a plurality of multi-server chassis.

* * * * *